April 18, 1933. O. STEINER 1,904,097
FILM HOLDER FOR PHOTOGRAPHIC CAMERAS
Filed April 6, 1931
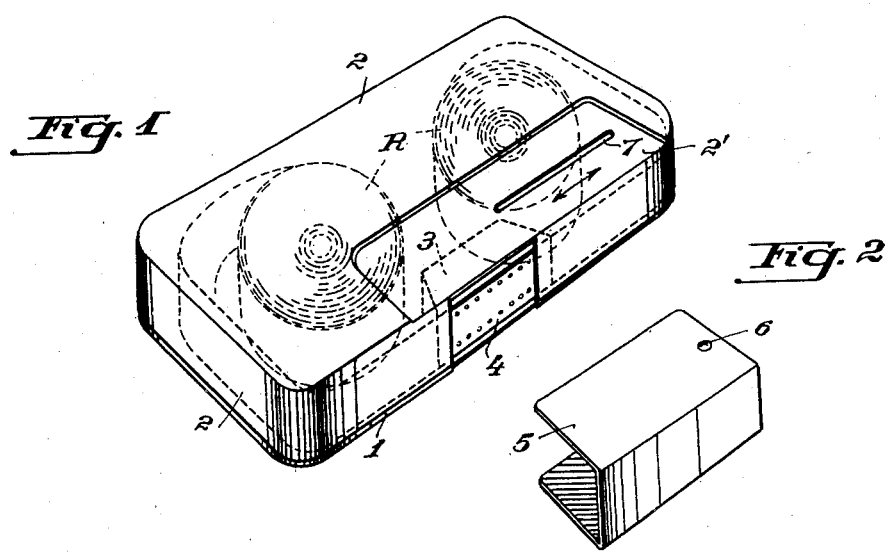
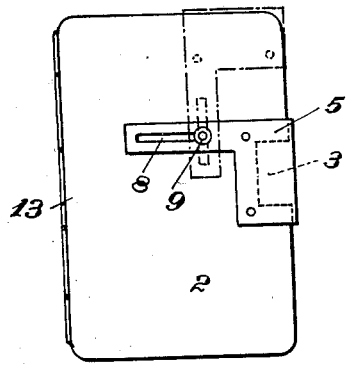
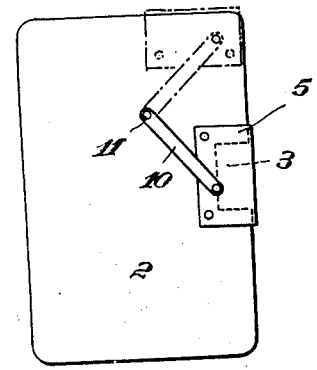
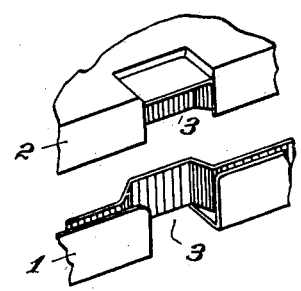
Inventor:
Otto Steiner
by
Lotka & Kellenbeck
Attorneys.

Patented Apr. 18, 1933                                                                            1,904,097

UNITED STATES PATENT OFFICE

OTTO STEINER, OF BERLIN-SPANDAU, GERMANY, ASSIGNOR TO SIEMENS & HALSKE, AKTIENGESELLSCHAFT, OF SIEMENSSTADT, NEAR BERLIN, GERMANY, A CORPORATION OF GERMANY

FILM HOLDER FOR PHOTOGRAPHIC CAMERAS

Application filed April 6, 1931, Serial No. 528,037, and in Germany August 18, 1930.

Difficulties are often experienced in removing film holders from photographic cameras of compact construction, for instance amateur cameras, for the reason that as a rule such holder fills almost the entire interior of the camera casing and therefore can not be grasped readily, as the user can get hold of the film holder only at the small marginal portion of the film holder cover, which marginal portion projects from the casing when the apparatus has been opened. This entails the danger of accidentally lifting off the cover, especially when it is not closed securely, from the body of the film holder which (with the film spools) would in this case remain in the apparatus, causing an undesired exposure and consequent spoiling of the film.

A further drawback arises in the case of film holders in which the film travels exteriorly of the holder on a portion of its path between the winding-off and the winding-on or take-up spool or reel; this drawback consists in the liability of this external film portion to become pinched or bent and thereby torn during transportation or by improper handling before the insertion of the film holder into the camera and after the removal of such holder from the camera.

According to the present invention, both of said drawbacks are avoided by the provision of a device which may be either connected permanently with the film holder or detachable therefrom, and which not only protects the above-mentioned external film portion during the time that the film holder is removed from the camera, but also prevents any accidental or unintentional separation of the parts of such film holder.

Three satisfactory and very simple embodiments of my invention are shown in the accompanying drawing, in which Fig. 1 illustrates one of said embodiments by a perspective view; Figs. 1a, 1b, and 2 are perspective views of details; Figs. 3 and 4 are top views of a second and a third embodiment respectively.

The film holder shown in the examples consists of the lower member 1 in which the film spools or reels R are housed in any well-known or approved manner, and of a separable upper member or cover 2, which (as in Figs. 1, 1a and 1b) may be simply fitted to slide up or down over said lower member (in which case the two members could be separated entirely), or the cover might be hinged to the lower member of the film holder, as indicated at 13 in Fig. 3. The holder is of substantially rectangular shape, and at one of its sides it has a re-entering portion or external recess 3, within which a portion of the film 4 travels exteriorly of the holder. The recess 3 is adapted to be covered completely, so as to exclude light, by a guard 5 here shown as a U-shaped clip of sheet-metal. The guard is removable or at least movable, so that the recess 3 may be covered or uncovered, as desired. Normally, as long as the holder is outside the camera, or separated therefrom, the guard 5 is in the position illustrated by solid lines in Figs. 3 and 4, in which it covers the recess 3 so as to protect the film portion contained in said recess, both against mechanical injury and the possibility of accidental exposure to light. When the user is about to insert the holder into the camera, he uncovers the recess 3, and places the holder in position. If then the light-sensitive film is fed to the exposure field (recess 3) in the well-known manner, say by turning one of the film reels, pictures can be taken in the usual way, since light from the objective can reach the film portion in the recess 3. The guard 5 may be arranged to slide lengthwise of the holder, as in the direction of the arrow shown in Fig. 1, for which purpose the cover 2 may be provided with a suitable recessed portion 2' which also limits the extent of such longitudinal movement. It will be understood that in one of its end positions, the guard 5 will clear the recess 3 entirely, for the purpose described. For a better guidance during its sliding movement, the guard 5 may have projections or grooves co-operating with corresponding grooves or projections respectively on the film holder proper. For instance, the guard may have a projection 6, and the holder a corresponding groove 7. The U-shaped guard is preferably made of spring-metal, so as to hold the upper member or cover 2 and the lower member 1 together by a clamping action, whether such guard be in the position illustrated, or in the shifted position in which it clears the recess 3.

During removal of the holder from the camera, the guard 5 will keep the members 1, 2 together, and will prevent any possibility of withdrawing the cover 2 alone and leaving the lower member 1 in the camera.

Instead of giving the guard a sliding movement, I may mount it pivotally or hingedly on one of the members of the film holder, the guard covering or uncovering the recess 3 as desired. Two constructions of this character are shown in Figs. 3 and 4. According to Fig. 3, the guard or clip 5 has an extension provided with a longitudinal slot 8, through which passes the pivot 9 secured to one of the members of the film holder, for instance the cover 2. Thus a sliding and pivotal connection is provided between the cover and the guard, so that the latter may be brought readily either to the position shown by full lines, to cover the recess 3, or swung to the position indicated by dotted lines, to clear such recess. In Fig. 4, the guard 5 is pivotally connected with one end of an arm 10, the other end of which is fulcrumed at 11 on one of the members of the film holder, for instance the cover 2. In this construction also, the guard can be brought either to a position covering the recess (see solid lines) or to a position clearing the recess (see dotted lines). These modifications and others may be made without departing from the nature of my invention as set forth in the appended claims.

The term "separable" as used in some of the claims, is not to be interpreted narrowly, as implying necessarily that the parts are susceptible of being disconnected entirely, but is to be given a broader meaning, so as to include constructions in which the parts remain connected with each other even after they have been moved apart to what may be termed the open position.

I claim:

1. A film holder constructed to house the winding-off reel and the take-up reel and composed of two companion members, said holder having an external recess within which a portion of the film is adapted to travel on its way from one reel to the other, exteriorly of the holder, and a guard constructed to embrace said two members and hold them together and adapted to cover said recess.

2. A film holder constructed to house the winding-off reel and the take-up reel and composed of two companion members, said holder having an external recess within which a portion of the film is adapted to travel on its way from one reel to the other, exteriorly of the holder, and a guard constructed to embrace said two members and hold them together and mounted to move on said holder from a position in which said guard covers said recess to another position in which it clears such recess.

3. A film holder constructed to house the winding-off reel and the take-up reel and having an external recess within which a portion of the film is adapted to travel on its way from one reel to the other, exteriorly of the holder, and a guard adapted to cover said recess.

4. A film holder constructed to house the winding-off reel and the take-up reel and having an external recess within which a portion of the film is adapted to travel on its way from one reel to the other, exteriorly of the holder, and a guard mounted to move on said holder from a position in which said guard covers said recess to another position in which it clears such recess.

5. A film holder constructed to house the winding-off reel and the take-up reel and having an external recess within which a portion of the film is adapted to travel on its way from one reel to the other, exteriorly of the holder, and a guard mounted to move on said holder from a position in which said guard covers said recess to another position in which it clears such recess, said holder and said guard being provided with co-operating projection and groove formations to guide the guard in its movement.

6. A film holder constructed to house the winding-off reel and the take-up reel and having an external recess within which a portion of the film is adapted to travel on its way from one reel to the other, exteriorly of the holder, and a guard mounted to move on said holder from a position in which said guard covers said recess to another position in which it clears such recess, said holder having portions acting as stops for the guard in each of its positions to determine such positions accurately.

7. A film holder constructed to house the winding-off reel and the take-up reel and having an external recess within which a portion of the film is adapted to travel on its way from one reel to the other, exteriorly of the holder, and a guard mounted on said holder to swing from a position in which said guard covers said recess to another position in which it clears said recess and is stopped by engaging a wall of the holder.

In testimony whereof I affix my signature.

OTTO STEINER.